United States Patent [19]
Frink et al.

[11] 3,744,045
[45] July 3, 1973

[54] POTENTIAL INDICATOR FOR HIGH VOLTAGE SWITCHGEAR

[75] Inventors: Russell E. Frink, Pittsburgh; John M. Kozlovic, Greensburg, both of Pa.

[73] Assignee: Westinghouse Electric Corporation, Pittsburgh, Pa.

[22] Filed: Dec. 24, 1970

[21] Appl. No.: 101,346

[52] U.S. Cl. ...... 340/248 R, 340/248 B, 340/252 R, 340/380
[51] Int. Cl. ............................................ G08b 21/00
[58] Field of Search .................. 340/248 R, 248 B, 340/248 C, 380, 252; 315/153, 227 R, 231; 174/139; 324/96, 122, 133

[56] References Cited
UNITED STATES PATENTS

| | | | |
|---|---|---|---|
| 2,081,839 | 5/1937 | Rankin | 324/96 |
| 2,358,425 | 9/1944 | Tickell | 340/380 UX |
| 3,461,384 | 8/1969 | Bayati et al | 324/96 |
| 3,524,178 | 8/1970 | Stratton | 340/248 C |
| 3,328,690 | 6/1967 | Lockie et al | 324/122 |
| 3,594,754 | 7/1971 | Voshall | 340/380 |

*Primary Examiner*—John W. Caldwell
*Assistant Examiner*—Daniel Myer
*Attorney*—A. T. Stratton and C. L. McHale

[57] ABSTRACT

A neon glow tube is mounted proximate to the high voltage conductors or bus bars of metalclad or metal enclosed switchgear. In the presence of high voltage on these conductors, the tube glows. A light sensing device detects the glow from the neon tube and either converts it to an electrical signal which is amplified through a suitable amplifying means and transmitted to a remote indicator or a fiber optics bundle carries the light from the glow tube to the remote indicator. In either case, a warning or indication is provid1d to operating personnel of the existence of high voltage within the metalclad or metal enclosed switchgear.

21 Claims, 5 Drawing Figures

POTENTIAL INDICATOR FOR HIGH VOLTAGE SWITCHGEAR

CROSS REFERENCES TO RELATED APPLICATIONS

Certain inventions disclosed in this application are related to those disclosed and claimed in copending application Ser. No. 101,347 which was filed concurrently with this application on Dec. 24, 1970 by R. J. Burgoon and assigned to the same assignee as the present application.

BACKGROUND OF THE INVENTION

This invention relates to potential indicators for high voltage switchgear.

High voltage metalclad or metal enclosed switchgear requries a safety system whereby the presence of voltage on the electrical conductors or bus bars within the switchgear is indicated to personnel who may have occasion to enter the equipment to perform some maintenance or other function. Ground and test devices are now used to indicate the presence of high voltage but they are relatively large and expensive. In addition, neon glow tubes or lights have been mounted outside or externally of the switchgear equipment. However under these circumstances the tube or light may glow because of the existence of extraneous electrical fields other than the electric field emanating from the bus bar whose potential the glow tube is intended to monitor thus causing uncertainty about the indication of such tubes. In the interest of safety and a more reliable indication, it would be desirable if the neon glow tube could be mounted relatively close to the associated high voltage bus bar which potential it is intended to monitor. However a problem arises if the flow tubes are mounted inside the associated switchgear equipment where they are not readily visible to personnel outside such equipment. It would therefore be desirable if the photons or light which a glow tube produces could be transformed or converted into another type of signal which, in turn, could be used to remotely indicate the presence of high voltage. U.S. Pat. No. 3,335,367 which is assigned to the same assignee as the present application and U.S. Pat. No. 3,485,940 show applications of light sources used in conjunction with high voltage conductors that provide an indication of the presence of the voltage in the conductor. However, none of the arrangements disclosed in the latter patents is intended for application to metalclad or metal enclosed switchgear. In such known arrangements, the light source is used, typically, indirectly and is not the primary source of voltage indication or the light source is used in conjunction with coding devices in relatively complicated schemes to indicate as nearly as possible the magnitude of voltage present at the associated conductor. It is then transmitted to a modulated light source which, in turn, produces light in the form of photons which are employed as carriers of the coded information.

SUMMARY OF THE INVENTION

In accordance with the invention, the presence of high voltage or potential within metalclad or metal enclosed switchgear equipment is indicated in a highly reliable manner. In the primary embodiment of the invention, a neon glow tube or similar device is connected at one terminal to a capacitance ring which, in turn, surrounds a high voltage insulated electrical conductor. The other terminal of the glow tube is merely left electrically "floating" or electrically unconnected thus creating a capacitive coupling between the freely hanging terminal and the metalclad switchgear. As a result a circuit results which includes the high voltage conductor, the glow tube or neon tube and the grounded metalclad switchgear. Interposed or effectively interconnected between the neon tube and both the metalclad switchgear and the electric conductor or bus bar are separate capacitive links. In the case of one capacitive link, the effective dielectric of the capacitive link comprises the electrical insulation provided for the high voltage conductor. In the other case, the effective dielectric of the other capacitive link comprises the air between the "floating" or unconnected terminal of the glow tube and the normally grounded metal enclosure of the associated switchgear. When high voltage is applied to the insulated conductor, a electric field is produced which causes the tube to glow or produce light within the metalclad switchgear. The glow or light may be detected by a light detecting means, such as a cesium cell, which is disposed within the metalclad switchgear and mounted proximate or adjacent to the glow tube. The light detecting means or cell may be of the type that either produces electrons or changes resistance in the presence of the light from the neon tube. The light detecting means is connected to an amplifying device which amplifies the effect of the change in resistance or the electrons produced and actuates the energization of a remote indicating light either on a front panel of the switchgear equipment or at some further removed location such as the console of a monitoring station.

In another embodiment of the invention, the light emanating from or produced by the excited neon tube is conducted to a nearby or adjacent mounted bundle of fiber optics which carries or transmits the light from the glow tube to the front of the metalclad switchgear equipment whereby it causes the opposite end of the fiber optics bundle to glow and provide an indication.

In still another embodiment of the invention, the space between the light sensing cell and the glow tube is enclosed by a dielectric cylinder such that both the glow tube and the light sensitive cell are disposed within the cylinder. This has the effect of removing or eliminating all extrinsic light from the environment around the glow tube, thus providing a true indication of the presence of substantial voltage even when light fibers through any openings which may be provided in the metalclad switchgear or one of the doors of the metalclad switchgear is inadvertently or deliberately opened and ambient light is allowed to enter the equipment. The cylinder is made of a dielectric or insulating material, such as porcelain, which is susceptible to permeation by the strong electric field but which is nevertheless an insulator against high voltage and which may also function as a strong structural supporting means for the associated parts in the disclosed embodiment.

It is important to note that in the first embodiment of the invention the potential indicator disclosed may be self-powered to the extent that the electric field emanating from the associated high voltage source or bus bar, may function as the energy source for the indicating system (unless an amplifier is included in the system) or for at least the first stage of the system. In the case of the fiber optics embodiment of the invention, no external power or energy is required at all.

DESCRIPTION OF THE PREFERRED EMBODIMENTS

Figure 1:
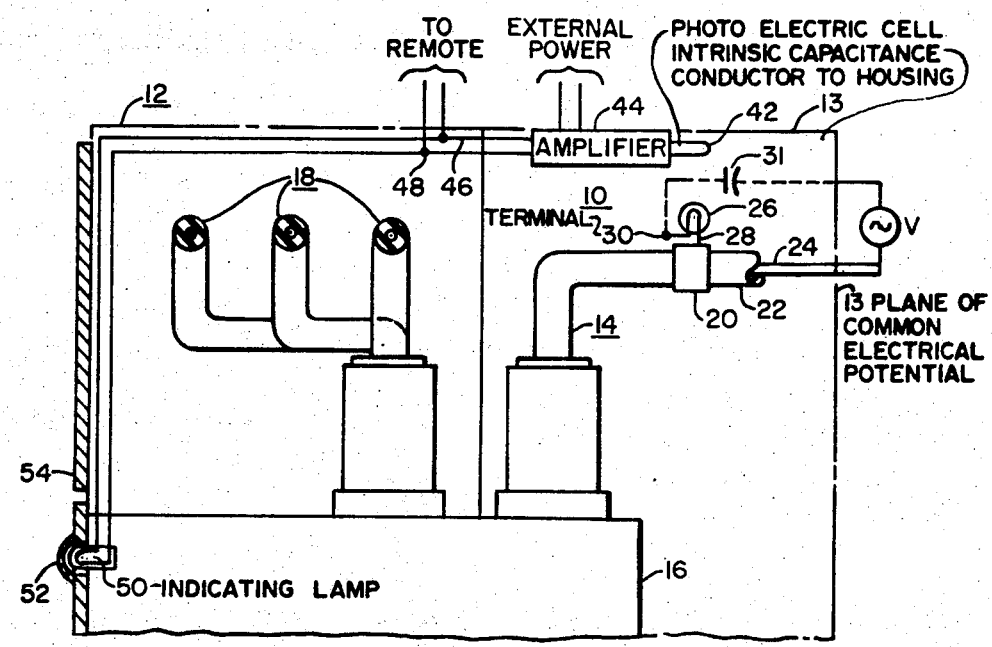
FIG. 1 shows the first embodiment of the invention mounted in metalclad switchgear.

Referring now to the drawings, and FIG. 1 in particular, a first embodiment of the invention is illustrated in a voltage detector or potential indicator 10. Voltage detector 10 is shown mounted or disposed within metalclad switchgear cabinet or housing 12 as shown diagrammatically in FIG. 1. The outer metal housing 12 is normally maintained as a common point or common region of electrical potential as indicated at 13. In other words, any point along the outer periphery 13 of the housing 12 constitutes part of a common region of electrical potential which is normally substantially equal to ground or zero potential. Electrical conductor or electrically insulated bus bar 14 for the metalclad switchgear indicated in FIG. 1 may be the conductor to be monitored to detect the pressure or absence of high voltage. The conductor 14 may be any incoming or outgoing lead for any type of metalclad switchgear. Normally, three leads or conductors are provided in each metalclad switchgear section 12 with any or all of them being independently monitored by corresponding voltage detectors 10. Conductor or bus bar 14 may supply electrical energy or power to or from circuit interrupter or circuit breaker 16 of the metalclad switchgear 12. Three electrical conductors 18 may represent electrically insulated bus bars or conductors which supply power to or from the circuit interrupter 16. Mounted on conductor 14 is a combination support and capacitive coupling band 20. Supporting band 20 is snugly or tightly secured to the electrical insulation 22 on conductor 14 by any convenient method. Insulation 22 is high voltage insulation which insulates the current carrying conductor or bus bar 24 from the ground potential planes 13 of the metalclad switchgear housing or cabinet 12. Illuminating means or gas discharge tube 26 having terminals 28 and 30 is electrically and conductively connected to capacitor band 20 by affixing or connecting one terminal 28 of tube 26 to capacitor band 20, the other terminal 30 of said tube being allowed to remain electrically floating or unconnected. The terminal 30 and equal potential or ground planes 13 form an effective capacitive link as shown by intrinsic or inherent capacitance 31. Consequently, a complete electrical circuit or network is formed by the voltage source V, which represents the source of a high voltage potential between the conductor 24 and ground, the effective capacitive link between conductor 24 and capacitor band 20, the gas discharge or neon glow tube 26, and the capacitive link 31 between the terminal 30 of the neon or gas discharge tube 26 and the equal potential or ground planes 13. The voltage source V may be a high voltage, 60 hertz alternating current source but is not limited to this. Consequently, values of voltage V, sufficient to energize the tube 26 through the previously mentioned capacitive links and the circuit previously discussed, cause neon or gas discharge tube 26 to glow. The circuit is most effective when V is of a high enough magnitude to create strong, electric fields through insulation 22 and the extrinsic capacitance 31. It is these strong electric fields to which light or neon tube 26 responds. When gas discharge tube 26 is energized, radiant energy in the form of light or photons is transmitted from neon tube 26 to a light-activated electron control means or photoelectric cell 42. Light impinging on photoelectric cell 42 may actuate the monitoring circuit, controlling electron flow or current within the circuit either by varying the effective electrical resistance within tube 42 or by acting as a current source in said circuit. Regardless of which type of control is employed, electronic gain means or amplifier 44 having an external source of power connected thereto may be provided to supply current through electrical leads or conductors 48 and 46 to an indicating means such as an indicating lamp 50. The output current supplied to the indicating lamp 50 is controlled by photocell 42. Lamp driver or amplifier 44 will cause current to flow in lines 48 and 46 to bulb or indicating lamp 50 when high voltage V is present between conductor 24 and equal potential region 13. Lamp 50 may have a mask or lens 52 to channel any light emanating from lamp 50 and lens 52 may be mounted on panel or front housing wall 54 of metalclad switchgear cabinet or housing 12.

Consequently, when voltage V is present, light emanating from or produced at neon tube 26 due to the presence of the electric fields generated by voltage V, actuates photocell 42 which, in turn, actuates or controls lamp driver or amplifier 44 to apply or supply energizing current to light or indicating lamp 50, thus causing light 50 to glow and indicate when high voltage is present at the outgoing or feeder conductor 24. The disclosed circuit thus provides a means for detecting high voltage on outgoing circuits from metalclad or metal enclosed switchgear indicating that these circuits are deenergized and may be serviced by personnel.

Figure 2:
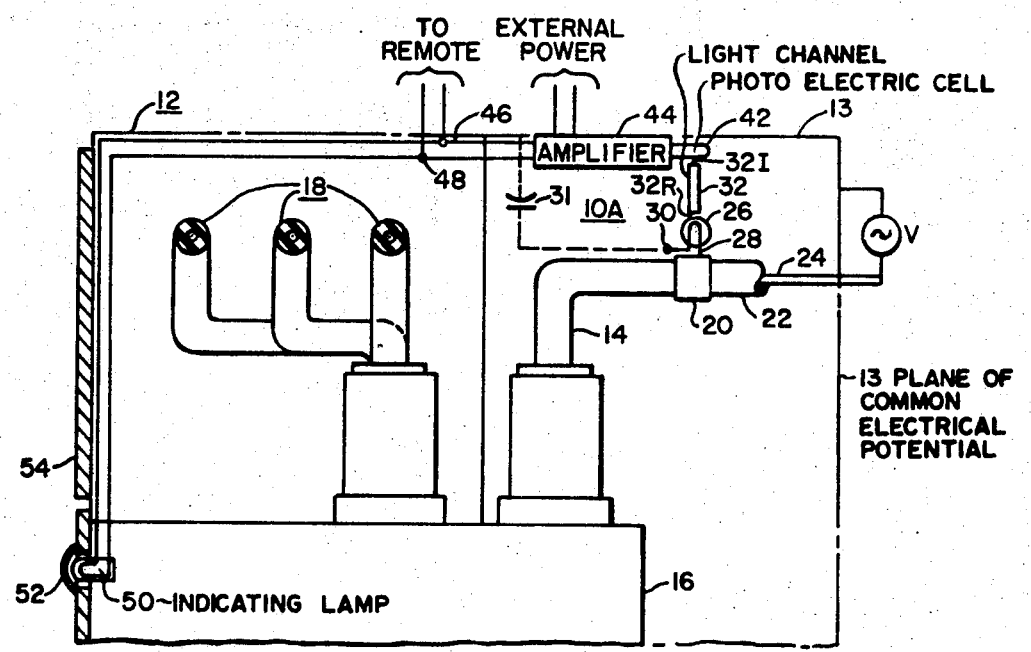
FIG. 2 shows an embodiment of the invention using fiber optics mounted in metalclad switchgear.

Another embodiment of the invention 10A is shown in FIG. 2 which is similar to the first embodiment shown in FIG. 1, except for the presence of a light conducting channel or means 32 which aids in the transmission of light from neon tube 26 to photocell 42. Light channel 32 may be a fiber optics bundle having an efficiency factor for transmitting light greater than the efficiency factor of the ambient atmosphere within metalclad switchgear cabinet or housing 12.

Figure 3:
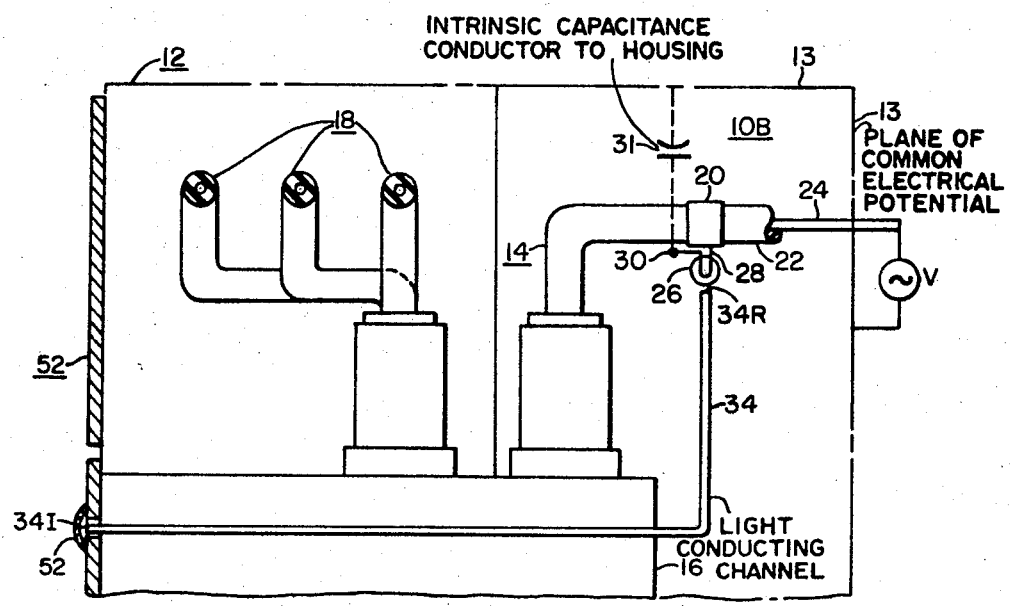
FIG. 3 shows another embodiment of the invention using fiber optics mounted in metalclad switchgear.

Another embodiment of the invention 10B is shown in FIG. 3 which is similar to the embodiments shown in both FIGS. 1 and 2 except that a relatively longer fiber optics bundle or light conducting channel 34 is employed instead of the relatively shorter light conducting channel or fiber optics bundle 32. In addition, photocell 42, lamp driver or amplifier 44, conductors 48 and 46, and lamp 50 are not required. Light emanating from or produced by neon tube 26 is projected onto receiving end 34R of fiber optics bundle 34, from where it is transmitted or carried through the fiber optics bundle to the indicating end 34I of said bundle. Indicating end 34I is positioned or disposed adjacent to and behind lens 52 in such a manner that the light being transmitted through fiber optics bundle 34 impinges on lens 52 after emanating from or appearing at indicating end 34I. This causes lens 52 to glow indicating the presence of high voltage in a similar manner to that discussed previously. It will be noted that the absence of lamp driver 44 eliminates the requirement for an external power source. In fact, the power or energy used to illuminate lens 52 is provided only from the electrical field created by voltage V which is transformed or converted into radiant light energy by neon tube 26.

Figure 4:
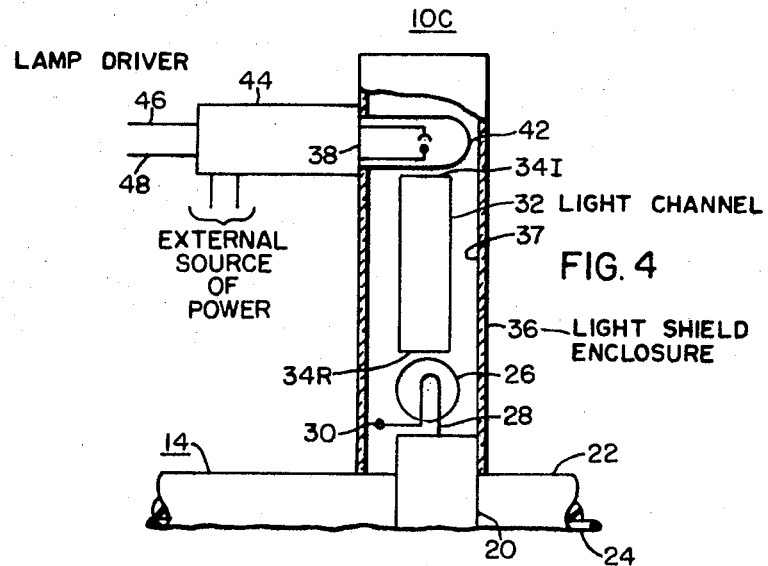
FIG. 4 shows another embodiment of the invention where a dielectric light shield is used.

Another embodiment of the invention is shown in FIG. 4 in a potential detecting circuit 10C. Voltage presence indicator or voltage detector 10C includes a neon gas discharge tube 26 which is mounted within a dielectric or electrically insulating light shield enclosure or means 36. Also mounted within shielding means 36 is photoelectric cell 42. The space between neon tube 26 and photocell 42 may be unobstructed or may be occupied by a light transmitting fiber optics bundle 32. In either case, the dielectric shield, which may be formed from a porcelain material, performs three functions. First, it may support photocell 42 and lamp driver 44; second, it insulates high voltage conductor 24 from equal potential planes 13 which are usually grounded, and third, it prevents ambient light from entering the enclosed chamber 37. It should be mentioned that lamp driver 44 may be supported elsewhere with a pair of electrically conducting leads attached to the terminals of cell 42. The presence of ambient light could actuate photocell 42 to randomly or inadvertently actuate or signal lamp driver 44 even though neon light 26 has not been energized by the presence of high voltage on conductor 24. This arrangement enhances the reliability of voltage detector system 10. Consequently, louvers or other openings in switchgear housing 12 will not result in arbitrary indication that high voltage is present on conductor 24 when in fact it is not.

Figure 5:
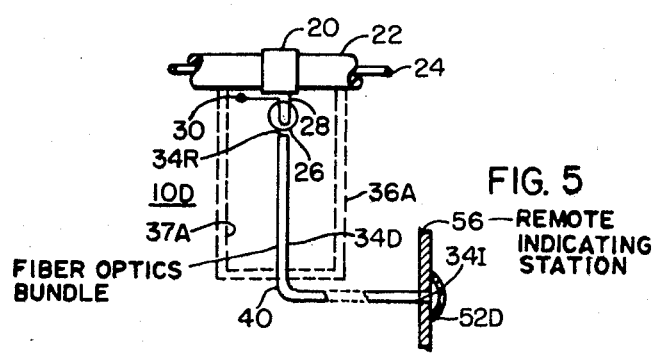
FIG. 5 shows an embodiment of the invention similar to the one shown in FIG. 3, except that a remote indicator is provided.

Another embodiment of the invention is illustrated in potential detector 10D which is shown in FIG. 5 and which is similar to the embodiment shown in FIG. 3, the only significant difference being the termination of fiber optics bundle 34D. Fiber optics bundle 34D is disposed in such a manner that it terminates at a console or indicating station as indicated at 56 which is remotely located with respect to metalclad switchgear housing 12 and bus bar or conductor 24. It will be noted by referring to FIGS. 1 and 2 that leads 48 and 46 may be employed to provide parallel electrical connections to remote stations also. Both of these modified embodiments may be employed to permit a plurality of switchgear stations to be monitored simultaneously at a centrally located remote station. It will also be noted that shield 36A which may be similar to shield 36 shown in FIG. 4, may be used with the potential detector 10D. In this case, the fiber optics bundle 34D is fed through hole or opening 40 in shield 36A whereas in the potential detector 10C, photocell 42 was connected to lamp driver 44 in the vicinity of opening 38 in shield 36. In potential detector 10D as in potential detector 10B, light is transmitted from gas discharge tube or neon bulb 26, when energized, to the receiving end 34R of fiber optics bundle 34D. Consequently, indicating end 34I of fiber optics bundle 34D which is located at remote station 56 transmits light to lens 52D whereupon lens 52D glows, indicating the presence of high voltage on conductor 24.

It is to be understood that voltage source V may provide any value of voltage and be of any desired frequency sufficient to actuate the circuits previously described. It should also be noted that in place of neon or gas discharge tube 26, other devices including light emitting diodes, may be used in the various disclosed embodiments provided that such devices are actuated by the presence of high voltage and the associated electric fields. It is also to be understood that while photocell 42 may be a cesium photocell, any light activated cell capable of controlling electrons or producing electrons for use in an amplifier circuit may be used. It is also to be understood that the fiber optics bundle 32 is generally designed to enhance the transmission of light through the space between photocell 42 and gas discharge tube 26. It is also to be understood that any number of bus bars or electrical conductors 14 may be monitored simultaneously or separately by combinations of the embodiments described in the present invention. It is also to be understood that simultaneous indications for different parts of metal enclosed or metalclad switchgear 12 may be obtained.

It is also to be understood that the word bus bar as used in the specification may apply to any electrical input or output conductor the cabinet or housing and onto which high voltage or potential may be applied.

The apparatus embodying the teachings of this invention have several advantages. For example, a potential detector as disclosed provides a substantially instantaneous indication of the presence of high voltage in potentially dangerous parts of metalclad or metal enclosed switchgear. This is accomplished without the use of heavy or complicated measuring equipment. In at least some embodiments of the invention, no external power at all is needed to provide an indication of the presence of high voltage on certain parts of the associated switchgear. Also, the effect of ambient light which would normally interfere with the proper indication of the presence of high voltage in certain parts of the metalclad switchgear may be virtually eliminated by the use of an electrically insulating or dielectric light shield made from porcelain or other type of dielectric material. Another advantage of this invention is the elimination of complicated decoding or signalling means often employed to detect the presence of high voltage in other kinds of voltage detection systems. Also, it is not necessary to accurately measure the voltage as is usually done in systems of this nature, but only to indicate the presence or absence of some predetermined voltage or potential. Another advantage is that a metal band surrounding the insulation on the high voltage electrode may be used to enhance the capacitive effect between the high voltage electrode and the neon glow tube.

We claim as our invention:

1. A voltage presence indicator comprising a gas discharge tube, said gas discharge tube being capable of producing light in the presence of an electric field created by an associated voltage without being directly connected to said source of voltage, a light conducting channel disposed adjacent to said gas discharge tube and extending to a location away from said gas discharge tube, said channel being capable of transmitting said light, said light transmitted by said channel being adapted to indicate the presence of said electric field at said location away from said gas discharge tube, an electrical conductor disposed adjacent to said gas discharge tube, and a region of common electrical potential disposed in the vicinity of and spaced from said conductor, any voltage difference applied between said conductor and said region of common potential creating said electric field, said gas discharge tube comprising a pair of terminals, one of said terminals being capacitively connected to said conductor, the other of said terminals being capacitively connected to said common region, said channel comprising a fiber optics bundle, said fiber optics bundle having a light receiving end and an indicating end, said light entering said fiber optics bundle at said receiving end and leaving it at said indicating end, a combination electrically conducting support piece-capacitor plate, electrically insulating material surrounding said electrical conductor, said combination support piece-capacitor plate being disposed adjacent the outer portion of said electrically insulating material, said combination support piece-capacitor plate having electrically connected thereto said one terminal of said gas discharge tube which is capacitively connected to said conductor, said combination support piece-capacitor plate enhancing the capacitive coupling between said one terminal and said conductor and also supporting said gas discharge tube thereon.

2. The combination as claimed in claim 1 wherein said outer portion of said electrically insulated material has a generally circular outer periphery, said combination support piece-capacitor plate comprises a cylindrical body surrounding a portion of said circular insulating material to further enhance the support and capacitance coupling characteristic of said combination support piece-capacitor plate.

3. A voltage presence indicator as claimed in claim 2 wherein a light actuated electron control means, an electronic gain means connected to said electron control means and an indicating means connected to said gain means are provided, said light from said indicating end actuating said electron control means to cause said electron control means to control electrons in said electronic gain means, said electronic gain means, in turn, actuating said indicating means to indicate the presence of said electric field and said voltage difference.

4. A voltage presence indicator as claimed in claim 3 wherein said electron control means comprises a photoelectric cell, and said indicating means comprises an indicating lamp.

5. A voltage presence indicator as claimed in claim 4, wherein said indicator is disposed inside metal enclosed switchgear, said region of common potential being at electrical ground potential.

6. A voltage presence indicator as claimed in claim 5 wherein said indicating lamp is located remotely with respect to said metalclad switchgear.

7. A voltage presence indicator as claimed in claim 4 wherein a dielectric light shielding means is disposed between said gas discharge tube and said photoelectric cell, said shielding means forming an enclosure capable of sustantially excluding external light from within said enclosure, said gas discharge tube, said fiber optics bundle, and said photoelectric cell being disposed within said enclosure.

8. A voltage presence indicator as claimed in claim 7, said indicator being disposed inside metal enclosed switchgear, said region being at ground potential.

9. A voltage presence indicator as claimed in claim 8, wherein said indicating lamp is located remotely with respect to said metalclad switchgear.

10. A voltage presence indicator as claimed in claim 2, said indicator being disposed inside metal enclosed switchgear, said region of common potential being at electric ground potential.

11. A voltage presence indicator as claimed in claim 10, wherein said indicating end is terminated remotely with respect to said metalclad switchgear.

12. A voltage presence indicator as claimed in claim 2, wherein a dielectric light shielding means is disposed adjacent said gas tube and said receiving end, said shielding means forming an enclosure capable of substantially excluding external light from within said enclosure, said gas discharge tube and said receiving end of said fiber optics bundle being mounted within said enclosure.

13. A voltage presence indicator as claimed in claim 12, said indicator being disposed inside metal enclosed switchgear, said common potential region being at ground electrical potential.

14. A voltage presence indicator as claimed in claim 13 wherein said indicating end is terminated remotely with respect to said switchgear.

15. A voltage presence indicator comprising a gas discharge tube being capable of producing light in the presence of an electric field, an electrical conductor disposed adjacent to said gas discharge tube, and a common point of electrical potential, said electric field being created when a voltage difference is applied between said conductor and said common point of electrical potential, said gas discharge tube being not directly electrically connected to said conductor, a light actuated electron control means disposed adjacent to said gas discharge tube, an electronic gain means connected to said electron control means and an indicating means connected to said gain means, said light from said gas discharge tube actuating said electron control means to thereby actuate said electronic gain means to energize said indicating means, said gas discharge tube comprising two terminals, one of said terminals being capacitively connected to said conductor, the other of said two terminals being capacitively connected to said common point, said electron control means comprising a photoelectric cell, a combination electrically conducting support piece-capacitor plate, electrically insulating material surrounding said electrical conductor, said combination support piece-capacitor plate being disposed adjacent the outer portion of said electrically insulating material, said combination support piece-capacitor plate having electrically connected thereto said one terminal of said gas discharge tube which is capacitvely connected to said conductor, said combination support piece-capacitor plate enhancing the capacitive coupling between said one terminal and said conductor and also supporting said gas discharge tube thereon.

16. The combination as claimed in claim 15 wherein said outer portion of said electrically insulating material has a generally circular outer periphery, said combination support piece-capacitor plate comprises a cylindrical body surrounding a portion of said circular insulating material to further enhance the support and capacitance coupling characteristic of said combination support piece-capacitor plate.

17. A voltage presence indicator as claimed in claim 16, wherein said indicator is disposed inside metal enclosed switchgear, said common point being at ground potential.

18. A voltage presence indicator as claimed in claim 17, wherein said indicating means comprises an indicating lamp located remotely with respect to said switchgear.

19. A voltage presence indicator as claimed in claim 16, wherein a dielectric light shielding means is provided, said shielding means forming an enclosure capable of substantially excluding external light from the interior of said enclosure, said gas discharge tube and said photocell being disposed within said enclosure.

20. A voltage presence indicator as claimed in claim 19, said indicator being disposed inside metal enclosed switchgear, said common point being a ground electrical potential.

21. A voltage presence indicator as claimed in claim 20, wherein said indicator means comprises an indicating lamp is located remotely with respect to said metal-clad switchgear.

* * * * *